United States Patent
Kallin et al.

[11] Patent Number: 5,701,592
[45] Date of Patent: Dec. 23, 1997

[54] METHOD AND SYSTEM FOR DESYNCHRONIZING OVERHEAD MESSAGES IN A RADIOCOMMUNICATION SYSTEM

[75] Inventors: Harald Kallin, Sollentuna; Roland Bodin, Spånga, both of Sweden

[73] Assignee: Telefonaktiebolaget LM Ericsson, Stockholm, Sweden

[21] Appl. No.: 358,316

[22] Filed: Dec. 19, 1994

[51] Int. Cl.⁶ .................................................. H04B 7/26
[52] U.S. Cl. .......................... 455/69; 455/34.2; 455/54.1; 370/337; 379/63
[58] Field of Search ........................ 455/33.1, 34.1, 455/34.2, 53.1, 54.1, 54.2, 56.1, 68, 69, 70; 370/95.1, 95.3, 110.1, 111, 85.2, 329, 337, 522; 379/59, 60, 63

[56] References Cited

U.S. PATENT DOCUMENTS

| | | | |
|---|---|---|---|
| 3,995,119 | 11/1976 | Pachynski | 179/15 AF |
| 4,271,509 | 6/1981 | Brolin | 370/110 |
| 4,449,248 | 5/1984 | Leslie et al. | 455/38 |
| 4,775,999 | 10/1988 | Williams | 379/59 |
| 4,914,649 | 4/1990 | Schwendeman et al. | 370/50 |
| 5,097,499 | 3/1992 | Cosentino | 379/59 |
| 5,150,361 | 9/1992 | Wieczorek et al. | 370/95.1 |
| 5,228,029 | 7/1993 | Kotzin | 370/95.1 |
| 5,230,084 | 7/1993 | Nguyen | 455/38.3 |
| 5,260,943 | 11/1993 | Comroe et al. | 370/95.1 |
| 5,265,270 | 11/1993 | Stengel et al. | 455/343 |
| 5,274,843 | 12/1993 | Murai et al. | 455/38.3 |
| 5,396,653 | 3/1995 | Kivari et al. | 455/88 |
| 5,404,355 | 4/1995 | Raith | 370/95.1 |
| 5,420,911 | 5/1995 | Dahlin et al. | 379/59 |
| 5,425,049 | 6/1995 | Dent | 375/202 |

FOREIGN PATENT DOCUMENTS

| | | |
|---|---|---|
| 339 740 | 11/1989 | European Pat. Off. . |
| 472 349 | 2/1992 | European Pat. Off. . |
| 582 754 | 2/1994 | European Pat. Off. . |
| WO88/08238 | 10/1988 | WIPO . |
| WO90/04841 | 5/1990 | WIPO . |

OTHER PUBLICATIONS

Partial International Search Report, (Annex to Form PCT/ISA/206) International Application No. PCT/SE95/01508, Date of Mailing: 31 May 1996.

*EIA: Interim Standard Cellular System . . .*, IS–3–D, Mar. 1987, pp. 3–16, 3–18, Fig. 3.7.1–1; Tables 3.7.1–3, 3.7.1–4; Subsections 2.6.3.11, 3.7.1.2.4.

*Primary Examiner*—Reinhard J. Eisenzopf
*Assistant Examiner*—Lee Nguyen
*Attorney, Agent, or Firm*—Burns, Doane, Swecker & Mathis, L.L.P.

[57] ABSTRACT

A method and system for controlling overhead information transmission in a radiocommunication system is described. By desynchronizing information trasmitted in two streams on a control channel, loads on the reverse control channel are more evenly distributed to minimize overload situations. Similarly, blocked calls can be prevented by judicious transmission timing of control filler messages relative to the overhead message trains. The relative timing of various registration parameters is also described to reduce extraneous registrations.

23 Claims, 5 Drawing Sheets

FIG. 9 ns'ng5,701,5921 2
METHOD AND SYSTEM FOR DESYNCHRONIZING OVERHEAD MESSAGES IN A RADIOCOMMUNICATION SYSTEM

BACKGROUND

Applicant's invention relates generally to radiocommunication systems and more particularly to radiocommunication systems in which overhead messages are transmitted for reception by remote units.

The growth of commercial radiocommunications and, in particular, the explosive growth of cellular radiotelephone systems have compelled system designers to search for ways to increase system capacity without reducing communication quality beyond consumer tolerance thresholds. System capacity, as the phrase is used herein, refers to both the capability to provide service for connections or calls, and to provide information to unconnected remote stations. As an example of one way in which capacity has been increased for connections between remote users and the system, digital communication and multiple access techniques such as TDMA have been implemented in lieu of analog technology to increase the number and/or quality of voice or traffic channels.

In addition to voice or traffic channels, cellular radiocommunication systems also provide paging/access channels, sometimes called control channels, for carrying paging messages and supervisory information between base stations and mobile stations. For example, according to AMPS (as standardized in IS-54), there are twenty-one dedicated analog control channels, which have predetermined fixed frequencies located near 800 MHz. Two frequency bands, each about 25-MHz wide, are provided for transmission and reception and include analog and/or digital traffic channels as well as the control channels.

While in the idle state, a mobile station monitors the control channel for paging and other messages addressed to it and at times will rescan the paging channels in order to stay tuned to the strongest paging (control) channel. Upon receiving the page response, the MSC selects an analog or digital traffic channel available to the base station that received the page response, switches on a corresponding radio transceiver in that base station, and causes that base station to send a message via the control channel to the called mobile station that instructs the called mobile station to tune to the selected voice or traffic channel. A through-connection for the call is established once the mobile station has tuned to the selected channel.

In addition to paging messages, other supervisory information is periodically broadcast over the control channel. This supervisory information is broadcast in sequences known as overhead message trains (OMT) on the Forward Control Channel (FOCC). For example, the overhead message train can be rebroadcast every second so that mobiles which have recently locked to the control channel can acquire the supervisory information. Included as part of the supervisory information are messages which can cause, either directly or indirectly, mobile stations to register with the system.

In some systems, the FOCC is split into, for example, three data streams. Two of these data streams are used to provide information to the mobile stations, while the third contains Busy/Idle information indicating if the Reverse Control Channel (RECC) is busy or idle. Whereas the FOCC provides a channel for transmissions from the base station to mobile stations, mobile stations transmit on the RECC to the base station. The former two streams, denoted herein as stream A and stream B, provide the same supervisory information but to different mobiles. For example, mobile stations having an even Mobile Identification Number (MIN) can listen to information on stream A, while mobile stations having an odd MIN can listen to information on stream B. The streams A and B are interleaved and transmitted on the FOCC such that the overhead message trains are sent twice, e.g., once per second on stream A and once per second on stream B.

Figure 1:
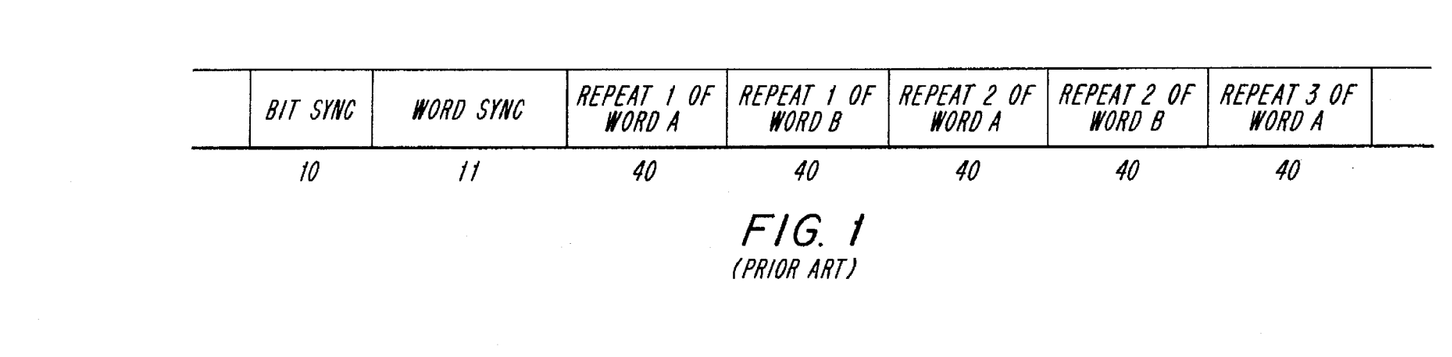
FIG. 1 illustrates a conventional example of a forward control channel having interleaved A and B streams.

FIG. 1 illustrates a portion of an FOCC having interleaved words from stream A and stream B. These words are preceded by bit sync and word sync fields which are used by the mobile stations to synchronize their receivers with the broadcast FOCC as is well known in the art. The numbers below the fields in FIG. 1 denote exemplary bit lengths of those fields, however, other length could of course be provided. Busy/Idle bits (not shown) are also interleaved among the fields illustrated in FIG. 1 to provide the mobile stations with an indication as to the status of the reverse control channel.

As mentioned above, some of the messages sent in the overhead message train can directly or indirectly cause one or more mobile stations to start an access attempt to the system. Since these messages can be sent in adjacent A and B stream words, the number of mobile stations which react to these messages by trying to access the system varies over time and are typically clumped around the times at which these messages are transmitted on the FOCC. This clumping may cause the RECC, the channel on which the mobiles attempt access, to be overloaded at various times.

Figure 2:
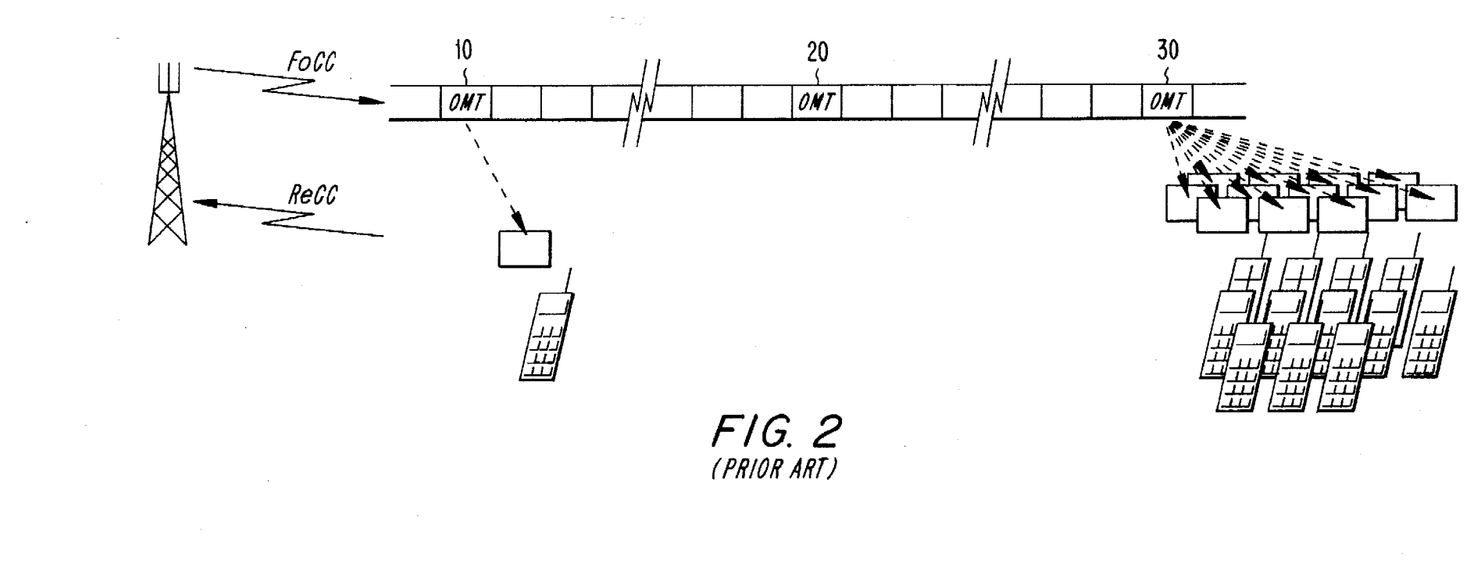
FIG. 2 depicts conventional transmission of messages which can cause system access and a resulting situation in which many mobile stations attempt access as a result of such conventional transmissions.

This feature of Conventional systems is illustrated pictorially in FIG. 2. Since messages in streams A and B follow one another sequentially as illustrated in FIG. 1, the time offset between the reception of these messages by mobiles listening to these respective streams is negligible for the purposes of considering the load on the reverse control channel. Accordingly, the OMTs 10, 20 and 30 illustrated in FIG. 2 represent both streams.

OMTs 10 and 30 in FIG. 2 contain messages which can cause mobile stations to attempt system access, while OMT 20 does not contain these types of messages. In the exemplary situation illustrated in FIG. 2, OMT 10 causes only a single listening mobile station to request access, but OMT 30 causes many mobile stations (both A and B stream listeners) to request access thereby causing an overload condition on the reverse control channel.

Other problems and limitations are also associated with transmissions on the control channels in conventional radiocommunication systems. For example, when a control channel has nothing else to transmit, the system broadcasts a Control Filler (CF) message. The CF message carries information such as a transmit power level for mobiles to use for access attempts and whether mobiles need to receive an OMT before they are allowed to start an access attempt. The system can also request that mobile station receive a CF message before starting system access. Thus, in situations where both a CF message and an OMT are to be received by the mobile station before system access, the relative timing of these messages becomes significant and has not been addressed in conventional systems.

Another drawback of conventional systems is found in the relative timing of messages which can cause mobile stations to attempt system access. In conventional systems, various messages which impact access attempts are sent in an unsynchronized manner. However, as will be further described below, this haphazard transmission scheme can, under certain circumstances, result in mobile stations registering plural times which is both inefficient and causes an extra load on both the RECC and common resources (such as the MSC, signalling links etc.) which are needed to process registrations.

SUMMARY

These and other drawbacks, problems and limitations of conventional radiocommunication systems are overcome according to the present invention. According to exemplary embodiments of the present invention, when messages are broadcast by the system which may cause mobile stations to attempt system access, these messages are sent on streams A and B at offset rather than adjacent times so as to desynchronize the reception of these messages by even and odd numbered MIN mobile stations. In this way, the load on the reverse control channel is spread out over time rather than being clumped to reduce the possibility of overload in response to any particular transmission on the OMT.

According to other exemplary embodiments of the present invention, the control filler message is transmitted a predetermined time period before the OMT so that a mobile station which desires system access, and which needs to receive both a CF and an OMT prior to attempting access, is provided with an optimized opportunity to receive both messages prior to timing out.

According to still other exemplary embodiments of the present invention, messages which may cause mobile stations to request access, such as the REGID and REGINCR messages, are transmitted together in an OMT and in an appropriate order so that plural registration attempts are eliminated.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Many of the following, illustrative embodiments are described in terms of AMPS (Advanced Mobile Phone Service) or TACS (Total Access Communication System), however those skilled in the art will appreciate that these embodiments are exemplary in nature and that the present invention can be applied to any radiocommunication systems.

Figure 3A:
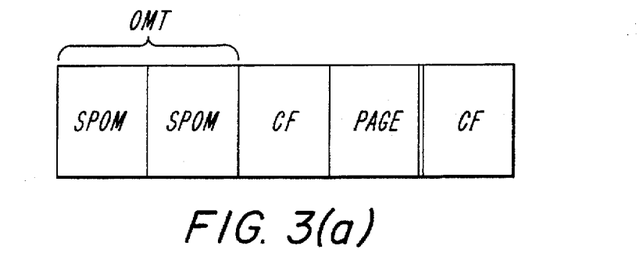
FIG. 3(a) illustrates a first exemplary OMT.
Figure 3B:
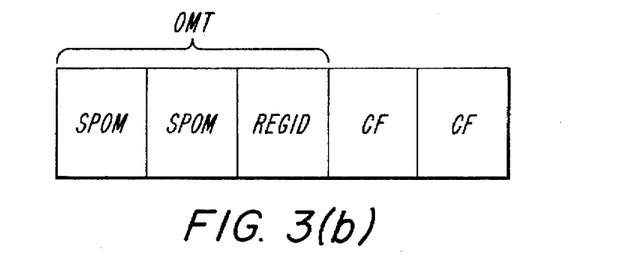
FIG. 3(b) shows a second exemplary OMT including a REGID message.
Figure 3C:
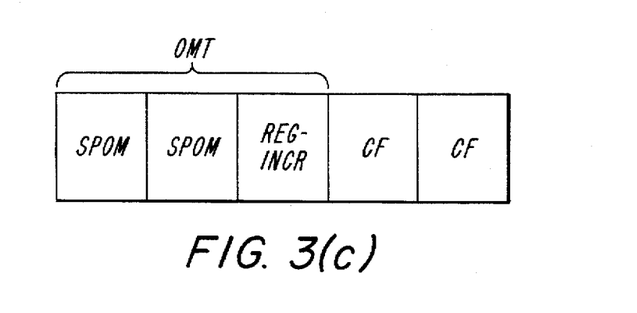
FIG. 3(c) shows a third exemplary OMT including a REGINCR message.

As mentioned above, the FOCC provides various functionality including paging and overhead messaging. FIGS. 3(a)–3(c) illustrate hypothetical message streams for the FOCC which should be referred to in conjunction with the following discussion. Therein, the following labels are used:

SPOM - - - System parameter overhead message (e.g., SID, DCC, NPC, etc.)

CF - - - Control Filler

REGINCR - - - Used to update an internal registration register in the mobile after each registration.

PAGE - - - A paging request.

REGID - - - Current value of program clock used for periodic registration.

OMT - - - Overhead Message Train

Note that in FIG. 3(a) the OMT includes two SPOM fields, whereas in FIGS. 3(b) and 3(c) the OMT also includes a REGID and REGINCR field, respectively. These hypothetical streams were selected in part to emphasize that not all OMTs will include fields, such as the REGID and REGINCR, which directly or indirectly cause mobile registration. The omission of such fields from some OMTs helps to avoid overloading the FOCC, but also has the effect described below of tending to intensify the clustering of access attempts. Another overhead message which will have a similar effect on mobile access attempts is the system ordered rescan command, whereby all mobile stations locked on to the control channel are commanded to scan all paging channels. Some of these mobiles will, after performing the rescan, discover that they have entered a new system or service area and therefore initiate registration.

Figure 4:
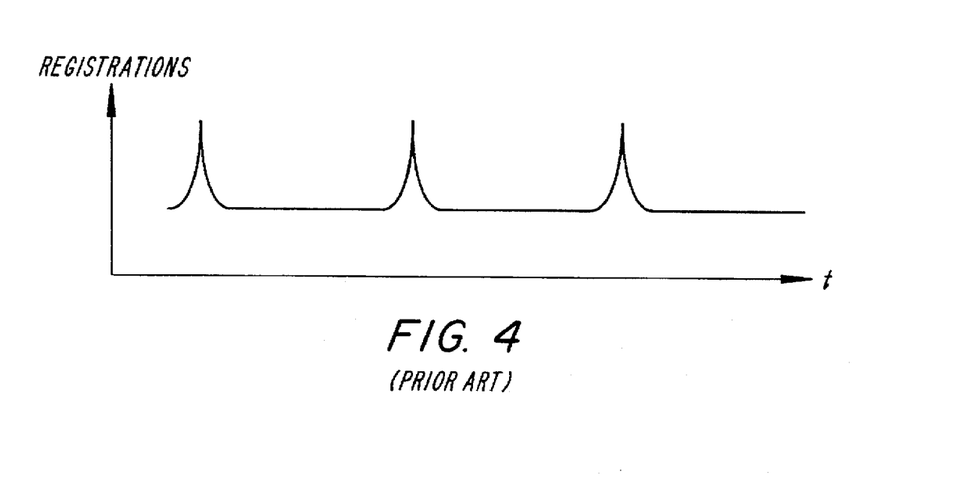
FIG. 4 is a graph showing an expected registration behavior in conventional systems.

The OMT is transmitted periodically on the FOCC. For example, in AMPS the OMT is transmitted every 0.5–1.1 seconds, while in TACS, the standard calls for OMT transmission every 0.65–1.25 seconds. In conventional systems the access-related fields can be transmitted in the OMT in adjacent, interleaved fields on the FOCC. For example, Word A and Word B of FIG. 1. This has the effect of intensifying access attempts on the RECC after the transmission times of these registration-related fields on the FOCC. Accordingly, a system might experience the registration behavior graphed in FIG. 4 wherein the peaks correspond to times shortly following the transmission on the A and B streams of the FOCC of an access-related field, such as a system ordered rescan.

According to exemplary embodiments of the present invention, however, access attempts are spread out by desynchronizing the transmission of the access-related fields on the A and B streams of the FOCC. The following example illustrates this concept.

Figure 5:
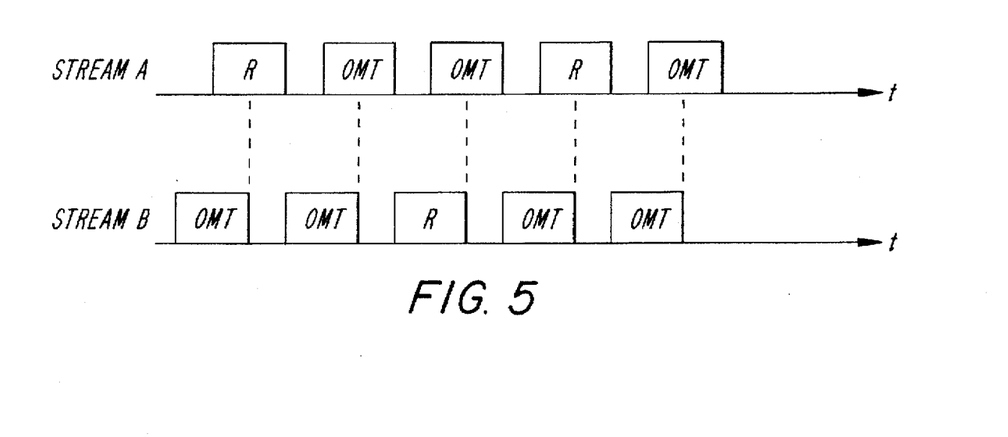
FIG. 5 shows exemplary OMT streams according to an exemplary embodiment of the present invention.

Suppose that a REGID field is inserted into every Nth OMT. For the purposes of this example N=3, however those skilled in the art will appreciate that N could be any number depending upon the desired frequency of transmission of a particular message. This example is illustrated in FIG. 5. Therein each of the blocks on the time axes represents an OMT, however only those marked with an 'R' include a REGID field. Note that the REGID field is inserted into the first and fourth OMTs in stream A, but into the third OMT in stream B so as to spread out the times at which mobiles listening to the A and B stream will receive the REGID message, respectively, and the times thereafter at which these mobiles may attempt to access the system.

Figure 6:
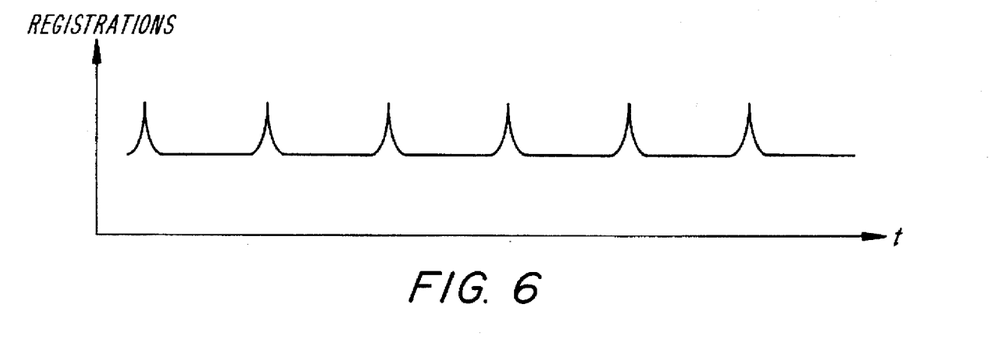
FIG. 6 is a graph showing an expected registration behavior resulting from usage of exemplary embodiments of the present invention.

To maximize separation of the transmissions of REGID on the A and B streams, the time between transmission of the REGID on stream A and subsequent transmission on stream B should be TOMT/2, if TOMT is taken to be the time period between transmission of two OMTs containing REGID on a stream. If N is even, this simply means inserting the field in every Nth OMT on one stream and N/2 OMTs later on the other stream. However, where N is odd, as in the example of FIG. 5, one stream can be shifted by one-half OMT with respect to the other stream in addition to inserting fields as described for the even N case, to achieve the same type of evenly separated REGID transmissions. This feature is illustrated by the dotted lines in FIG. 5 which denote that stream A is shifted one-half OMT behind stream B on the time axis. REGINCR, system ordered rescan, and any other fields which may directly or indirectly cause mobile stations to initiate access attempts can be treated in a similar manner. As a result of transmitting these access-related fields in the aforedescribed offset and/or shifted manner, registration behavior could, for example, be that reflected in the graph of FIG. 6. Note that the peaks in FIG. 6 are lower and more numerous than those in FIG. 4 to emphasize the feature of the present invention that load on the RECC is more evenly spread out.

Although the foregoing exemplary embodiment depicts a desynchronization of the streams wherein similar fields on streams A and B are separated by a maximum time period, i.e., TOMT/2, those skilled in the art will appreciate that this particular separation is not required to implement the present invention. Rather, any separation which more evenly distributes access attempts by the different mobiles listening to the A and B streams is contemplated. For example, the larger that N becomes the less necessary it is to achieve a maximum separation in time between transmissions of similar access-related messages on each stream.

As illustrated in FIGS. 3(a)–3(c), systems transmit control fillers (CFs) when there are no other messages, i.e., paging or overhead, to be sent. However, these messages are not fillers in the sense of carrying no meaningful information. In fact, the CF messages can include, for example, transmit power level commands, extensions to the digital color code (DCC), location parameters, authentication parameters and commands for mobiles to receive an OMT prior to attempting system access. Thus, in some systems a mobile station may be required to receive both a CF message and an OMT prior to attempting access.

In such systems, there is usually a predetermined time period within which a mobile unit needs to receive a CF message prior to timing out. For example, in AMPS this time period is 1 second and in TACS this time period is 1375 milliseconds. If the CF commands the mobile to all receive an OMT prior to attempting access, a time period is also established for this activity. For example, AMPS provides a 1.5 second period and TACS provides a 1.9 second period. Since OMTs are transmitted between 0.5 and 1.1 seconds (AMPS) or 0.65 and 1.25 (TACS), the mobile station can potentially receive between 1 and 3 OMTs during the period allotted for this activity.

Like any other message transmitted over the air interface, the OMT may not be received properly by the mobile station due to co-channel interference, Rayleigh fading, or any of a plurality of adverse conditions that radio transmissions may encounter. If the mobile station does not properly receive an OMT within the predetermined time period for this activity, then the access attempt fails and the call is blocked.

To minimize the number of calls which are blocked for this reason, according to another exemplary embodiment of the present invention, the CF message is sent either immediately prior to the transmission of the OMT or at least within a predetermined time period before the transmission of the OMT so as to maximize the number of subsequent OMTs to be transmitted before the mobile station will time out if an OMT is not received successfully. The following example demonstrates this principle.

Assume that an OMT is transmitted every second in an exemplary AMPS system. By transmitting the CF message (0.5—the length of the OMT) seconds before each OMT the system will ensure that each mobile station which has been commanded to receive an OMT before attempting to access the system will receive at least two OMTs prior to timing out. More generally, a CF message should be transmitted X seconds before an OMT where X is defined as:

X=(max time)–(max length of OMT)–n x (period between OMTs) where:

max time=the maximum time period allowed for reception of both a CF and an OMT;

max length of OMT=the maximum length of an OMT used/expected in a particular system;

period between OMTs=period between start of successive OMT transmissions; and n=largest integer that keeps X positive.

Figure 7:
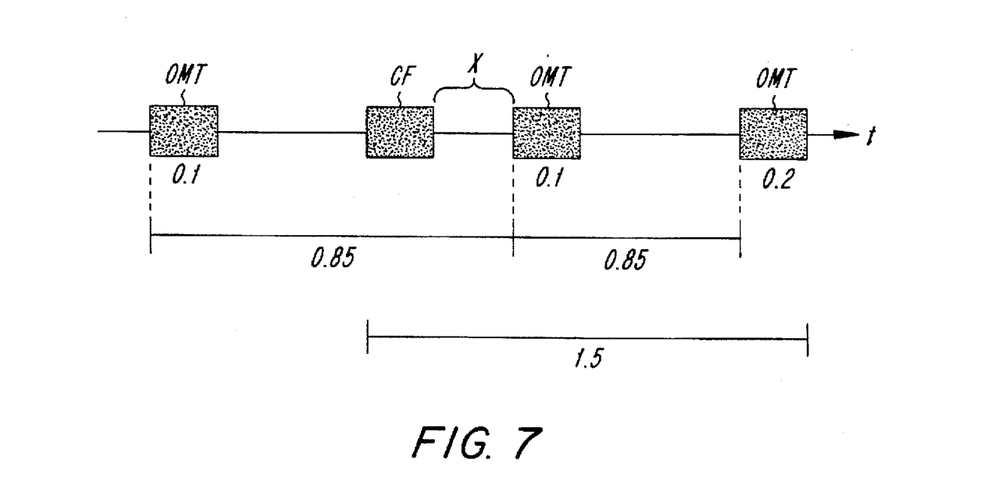
FIG. 7 illustrates a timing relationship between a filler message and an OMT according to an exemplary embodiment of the present invention.

An example serves to illustrate this generalization. Note that the time periods illustrated in FIG. 7 are purely exemplary and that the present invention is applicable to systems having other time periods. In FIG. 7, the time line illustrates a stream of OMTs with the numbers directly beneath the OMTs indicating their respective duration. In the example of FIG. 7, the maximum length of an OMT is 0.2 seconds. The first measurement line directly beneath the time line in FIG. 7 demonstrates that the exemplary time between the start of OMT transmissions is 0.85 seconds. The lower measurement line illustrates that the maximum period allowed in this exemplary system for receiving both a CF and an OMT is 1.5 seconds. Using the above equation then:

$$X=1.5-0.2-(1)(0.85)=0.45 \text{ seconds.}$$

In other words, the CF should be transmitted at most 0.45 seconds before the transmission of each OMT to ensure that the mobile station has the greatest possibility of properly receiving both messages.

As another example, suppose that the time between OMT transmissions was 0.65 seconds instead of 0.85 seconds. In such a case:

$$X=1.5-0.2-(2)(0.65)=0.$$

Thus, the CF should be sent immediately before the OMT in such a system.

As discussed previously, several parameters or fields which are transmitted in the OMT effect registration. In AMPS and TACS, two of these are REGID and REGINCR which are used to control the times at which mobile stations register in systems using periodic registration. The REGID message is periodically broadcast, for example every four seconds, and includes an indication of a current system time kept by a system clock, which can be implemented, for example, as a counter having a number between 0 and $2^{20}-1$. Periodic registration is used to determine which mobile stations in an area are active at any particular time. Thus, each mobile station reports at regular intervals, for example ever 20 or 30 minutes, to the system.

Figure 8A:
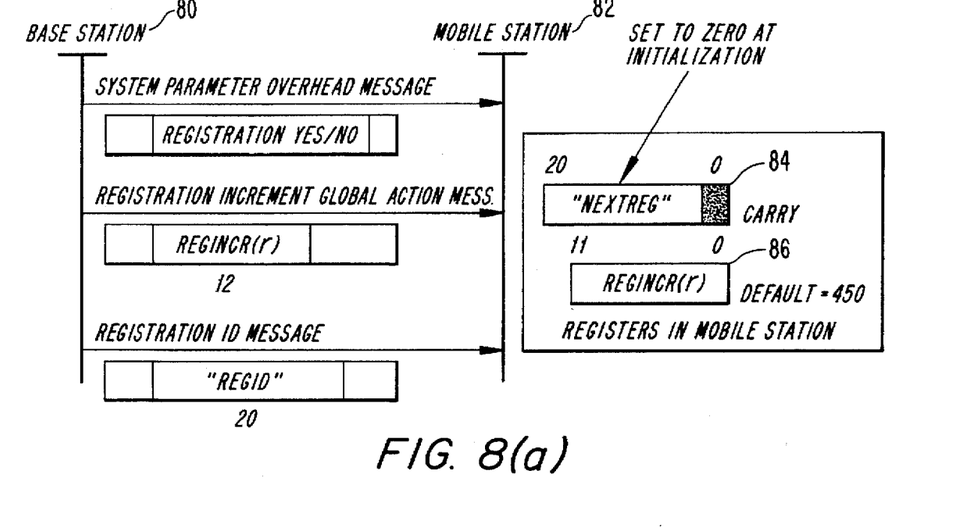
FIG. 8(a) shows messages from a base station to a mobile station and registers in a mobile station according to an exemplary embodiment of the present invention.

Since registration is optional, the system indicates to the mobile stations if they should use the registration function. This is accomplished by transmitting a message from the base station 80 in the SPOM indicating whether or not registration is used by the system to the mobile stations, for example MS 82, as illustrated in FIG. 8(a). A stored numeric indicator, for example NEXTREG counter 84 in FIG. 8(a), in the mobile station controls when registration is performed by that mobile. This numeric indicator is set to zero at some initial initialization, but remains stored in the mobile when the mobile is powered off.

The system sends a REGID message which typically increments its REGID value, i.e., the current system time every time the REGID message is sent. Once the REGID value exceeds or is equal to the stored numeric indicator, e.g., the value of NEXTREG counter 84, the mobile station will register with the system. If the registration is successful, then the mobile station will calculate the next registration time, NEXTREG, as REGID+REGINCR where REGID is the last received REGID value and REGINCR is the last received REGINCR value or the default REGINCR value. The default REGINCR value, e.g. 450, which can be stored at memory block 86 in FIG. 8(a), is a value which is typically greater than the REGINCR value broadcast by the land system.

Figure 8B:
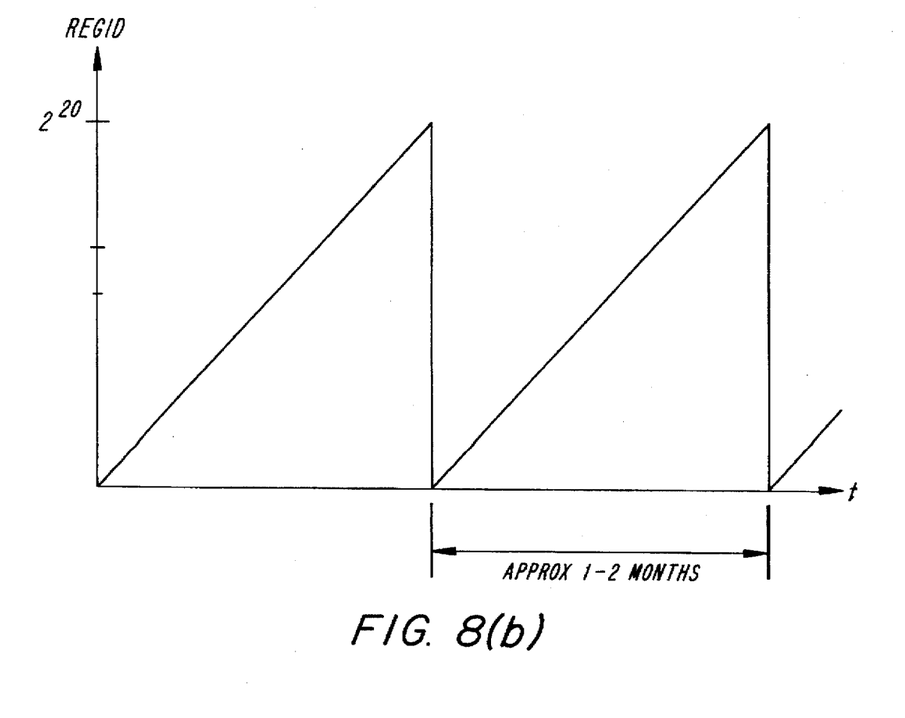
FIG. 8(b) illustrates an exemplary REGID parameter as it varies over time.

Since the maximum value of REGID is a finite number, e.g., $2^{20}$, REGID will cycle through zero at times. This is shown by the graph of FIG. 8(b) where it is illustrated that, for example, this could occur every 1–2 months. This could create problems when the mobile station's NEXTREG value is close to REGID's maximum value (e.g., $2^{20}$). For example, suppose that the mobile station fails to receive any REGID message that is greater than NEXTREG before REGID reaches its maximum value (e.g. $2^{20}$) and REGID subsequently starts over at zero. The offset between REGID and NEXTREG creates a situation whereby the inequality to be satisfied for registration cannot be satisfied, at least until REGID cycles back to its peak value in a month or two.

This difficulty is overcome in conventional systems by providing a consistency check where the mobile station compares the value of NEXTREG with the value of REGID+REGINCR+5. The addition of "5" to this equation allows slight offsets in the REGID clock between different control channels which otherwise may cause unnecessary registrations when a mobile station moves from one cell to another. If NEXTREG is greater than or equal to REGID+REGINCR+5, then the mobile station will replace NEXTREG with the greater of 0 and NEXTREG$-2^{20}$.

While this may overcome the immediate problem described above, other difficulties are actually caused by the consistency check provided by conventional systems' approaches toward periodic registration. For example, suppose that the mobile station uses the default value (e.g., 450) for REGINCR at a first registration and then receives a transmitted REGINCR value of, for example, 225. In such a situation, the consistency check described above will indicate that NEXTREG is indeed greater than REGID+REGINCR+5 (assuming that REGID has increased by less than 220 in the meantime). Then NEXTREG will be reset as described above, for example to zero. Accordingly, when the equality which determines whether or not registration is to be performed is evaluated, it is likely that REGID will be greater than or equal to NEXTREG. A second, and unnecessary, registration will then be attempted by the mobile station.

According to exemplary embodiments of the present invention, this difficulty is overcome by transmitting a REGINCR message followed by a REGID message in the same OMT when the value of REGINCR differs from, e.g., is less than, the default REGINCR value. In this way, consistency checks will not be deceived into resetting the NEXTREG value so as to induce a double registration. Another solution to the aforedescribed double registration problem is to adjust the transmission and/or the increment rates of REGID so that the transmitted REGINCR value will always be greater than or equal to the default REGINCR value. In this way, the consistency check would not fail solely because the mobile station did not timely receive a transmitted REGINCR value.

Since the present invention can be applied to any type of radiocommunication system, the particular base station or mobile station structure is not particularly germane to this discussion. For purposes of completeness, however, a brief summary of exemplary structures will now be provided. Those skilled in the an will readily appreciate that other base station and/or mobile station configurations could also be used.

Figure 9:
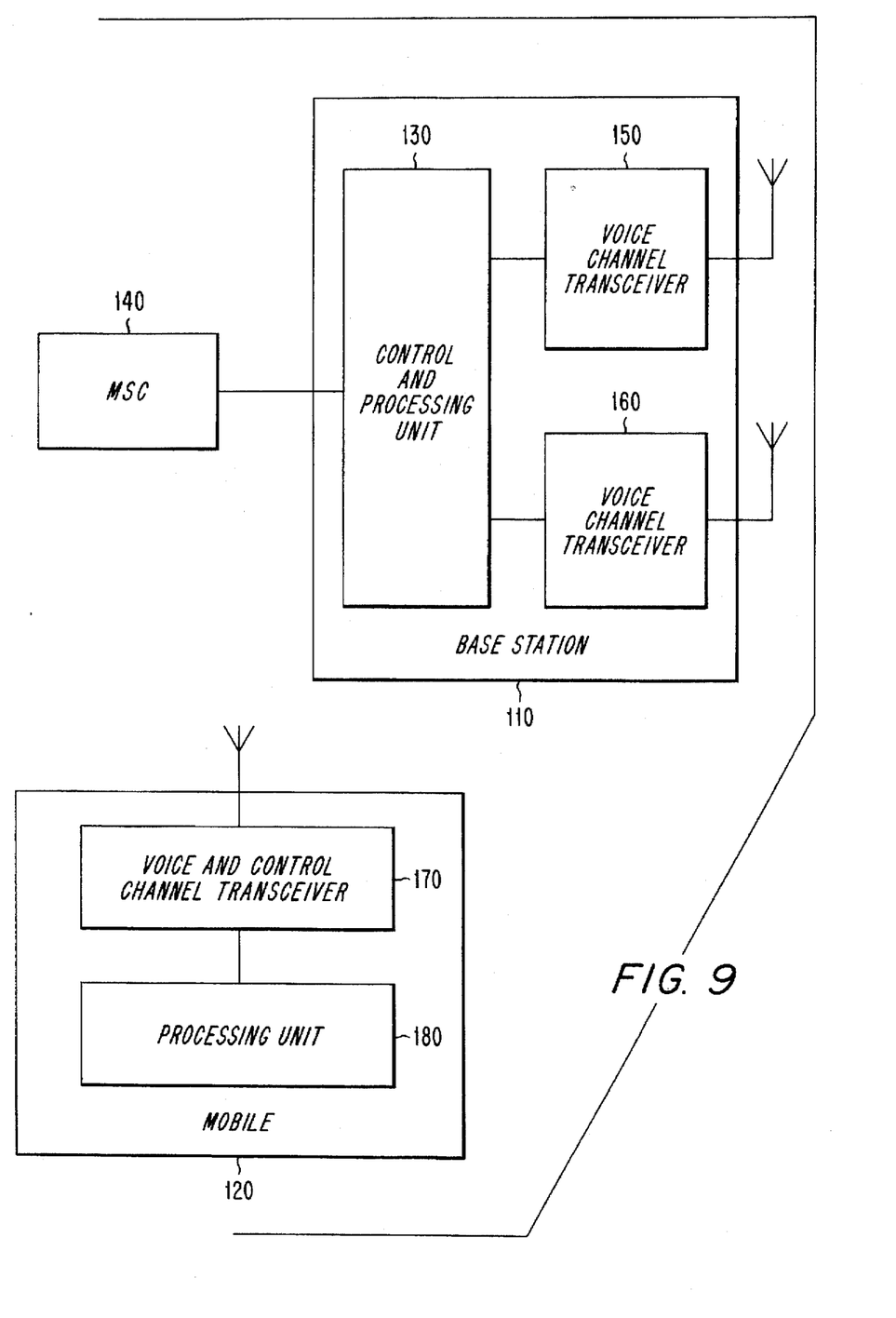
FIG. 9 represents a block diagram of an exemplary base station and mobile station.

FIG. 9 represents a block diagram of an exemplary cellular mobile radiotelephone system according to one embodiment of the present invention which can be used to implement the foregoing. The system shows an exemplary base station 110 and a mobile 120. The base station includes a control and processing unit 130 which is connected to the MSC 140 which in turn is connected to the public switched telephone network (not shown).

The base station 110 for a cell includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel. This control information can include the OMTs and CFs as described above.

When the mobile 120 first enters the idle mode, it periodically scans the control channels of base stations like base station 110 to determine which cell to lock on or camp to. The mobile 120 receives the absolute and relative information broadcast on a control channel at its voice and control channel transceiver 170. Then, the processing unit 180 evaluates the received control channel information which includes the characteristics of the candidate cells and determines which cell the mobile should lock to. The received control channel information not only includes absolute information concerning the cell with which it is associated, but also contains relative information concerning other cells proximate to the cell with which the control channel is associated. These adjacent cells are periodically scanned while monitoring the primary control channel to determine if there is a more suitable candidate.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for periodically transmitting supervisory messages on a control channel in a radiocommunication system comprising the steps of:

providing a first and second stream of supervisory messages each including substantially the same information;

interleaving portions of said first and second streams including substantially the same information;

offsetting said interleaved portions of said first and second streams by a predetermined time period which is greater than a transmission time of one of said portions; and periodically transmitting said offset, interleaved portions of said first and said second streams on said control channel.

2. The method of claim 1, wherein said step of offsetting further comprises the step of:

offsetting said interleaved portions by approximately half of a time between transmission of said first stream on said control channel.

3. A method for transmitting supervisory messages on a control channel in a radiocommunication system comprising the steps of:

providing first and second streams of supervisory messages;

including a particular instruction within every Nth supervisory message in said first stream and within every Nth supervisory message in said second stream;

shifting said second stream by a predetermined time period;

interleaving said first and second streams such that said every Nth supervisory message in said first stream is offset from a corresponding Nth supervisory message in said second stream by said predetermined time period; and transmitting said first stream and shifted second stream on said control channel.

4. The method of claim 3, wherein said step of shifting further comprises:

shifting said second stream by a period which is approximately half of a time between transmissions of said first stream.

5. The method of claim 3, wherein said particular instruction is a message associated with registration.

6. The method of claim 3, wherein said particular instruction is a message associated with ordering a mobile station to perform a rescan of paging channels.

7. A method for periodically transmitting supervisory messages on a control channel in a radiocommunication system comprising the steps of:

transmitting a stream of supervisory messages on said control channel; and transmitting a control filler on said control channel within a predetermined time period prior to transmission of each of said supervisory messages, wherein the predetermined time period is set so as to maximize a number of the supervisory messages which are transmitted before a timeout period of a mobile receiving the control channel expires.

8. The method of claim 7, wherein said control fillers include information associated with a power level at which remote stations should transmit access requests.

9. The method of claim 7, wherein said control fillers include information associated with ordering a remote station to receive supervisory messages prior to making a system access.

10. The method of claim 7, wherein said supervisory messages include registration related messages.

11. A method for periodically transmitting supervisory messages on a control channel in a radiocommunication system comprising the steps of:

transmitting a stream of supervisory messages on said control channel; and transmitting a control filler on said control channel within a predetermined time period prior to said transmission of said stream of supervisory messages, wherein said predetermined time period is equal to a maximum time period allowed for reception of both said control filler and said stream of supervisory messages minus a maximum length of said stream of supervisory messages minus a multiple of a period between a start of successive streams of supervisory messages.

12. A method for transmitting registration parameters on a control channel in a radiocommunication system comprising the steps of:

grouping supervisory messages together for periodic transmission on said control channel;

providing a first registration parameter which provides an indication of a current time;

providing a second registration parameter which provides an indication of a time for periodic registration relative to said current time; and transmitting said second registration parameter prior to, and adjacent to, said first registration parameter when said first registration parameter is included in a group of said supervisory messages to be transmitted on said control channel, wherein some of said groups of supervisory messages include said first registration parameter.

13. A system comprising:

a transmitter for periodically transmitting supervisory messages on a control channel, wherein first and second streams of supervisory messages are transmitted in an interleaved fashion on said control channel;

a receiver for receiving registration messages; and a processor for providing said first and second streams of supervisory messages, wherein each stream includes substantially the same information, and wherein corresponding messages in said first stream which result in said registration messages are offset from messages in said second stream which result in said registration messages.

14. A system comprising:

a transmitter for transmitting first and second streams of supervisory messages in an interleaved fashion on a control channel; and a processor for including a particular instruction within every Nth supervisory message in said first stream and within every Nth supervisory message in said second stream, and for shifting said second stream by a predetermined time period such that every Nth supervisory message in said first stream is offset from a corresponding Nth supervisory message in said second stream by said predetermined time period.

15. The system of claim 14, wherein said processor shifts said second stream by a period which is approximately half a time between transmissions of said first stream.

16. The system of claim 14, wherein said particular instruction is a message associated with registration.

17. The system of claim 14, wherein said particular instruction is a message associated with ordering a mobile station to perform a rescan of paging channels.

18. A system comprising:

a transmitter for periodically transmitting a stream of supervisory messages on a control channel; and a processor which provides control fillers to said transmitter for transmission on said control channel, the transmission of a control filler occurring within a predetermined time period prior to transmission of each of said supervisory messages, wherein the predetermined time period is set so as to maximize a number of the supervisory messages which are transmitted before a timeout period of a mobile receiving the control channel expires.

19. The system of claim 18, wherein said control fillers include information associated with a power level at which remote stations should transmit access requests.

20. The method of claim 18, wherein said control fillers include information associated with ordering a remote station to receive supervisory messages prior to making a system access.

21. The system of claim 18, wherein said supervisory messages include registration related messages.

22. A system comprising:

a transmitter for periodically transmitting a stream of supervisory messages on a control channel;

a processor which provides a control filler to said transmitter for transmission on said control channel within a predetermined time period prior to said transmission of said stream of supervisory messages, wherein said predetermined time period is equal to a maximum time period allowed for reception of both said control filler and said stream of supervisory messages minus a maximum length of said stream of supervisory messages minus a multiple of a period between a start of successive streams of supervisory messages.

23. A system comprising:

a transmitter for transmitting registration parameters as part of a stream of supervisory messages on a control channel, wherein said supervisory messages are transmitted in periodic groups; and a processor which provides a first registration parameter as an indication of a current time and a second registration parameter as an indication of a time for periodic registration relative to said current time, wherein said transmitter transmits said second registration parameter prior to, and adjacent to, said first registration parameter in only some of said period groups on said control channel.

* * * * *